US012766351B2

(12) United States Patent
Böke et al.

(10) Patent No.: US 12,766,351 B2
(45) Date of Patent: Oct. 20, 2026

(54) FIRE EXTINGUISHING SYSTEM FOR A ROOF WITH A SOLAR INSTALLATION

(71) Applicant: Minimax Viking Patent Management GmbH, Bad Oldesloe (DE)

(72) Inventors: Joachim Böke, Düsseldorf (DE); Oliver Schröder, Lübeck (DE); Niels Denkert, Bad Oldesloe (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 838 days.

(21) Appl. No.: 18/036,064

(22) PCT Filed: Feb. 15, 2021

(86) PCT No.: PCT/EP2021/053674

§ 371 (c)(1),
(2) Date: May 9, 2023

(87) PCT Pub. No.: WO2021/160890

PCT Pub. Date: Aug. 19, 2021

(65) Prior Publication Data

US 2025/0295943 A1 Sep. 25, 2025

(30) Foreign Application Priority Data

Feb. 13, 2020 (DE) ......................... 102020103814.3

(51) Int. Cl.
*A62C 3/16* (2006.01)
*A62C 5/02* (2006.01)
(Continued)

(52) U.S. Cl.
CPC ................ *A62C 3/16* (2013.01); *A62C 5/024* (2013.01); *A62C 35/68* (2013.01); *A62C 37/36* (2013.01); *F24S 20/67* (2018.05); *H02S 20/23* (2014.12)

(58) Field of Classification Search
CPC ................................ Y02B 10/10; Y02E 10/50
See application file for complete search history.

(56) References Cited

U.S. PATENT DOCUMENTS 4,330,040 A * 5/1982 Ence .................. A62C 99/0072 248/237
5,263,543 A 11/1993 Nigro
(Continued)

FOREIGN PATENT DOCUMENTS

DE 102010050589 5/2012
DE 102010050589 A1 * 5/2012 ............. A62C 35/60
(Continued)

OTHER PUBLICATIONS

Machine Translation for DE102010050589 (Year: 2012).*
(Continued)

*Primary Examiner* — Tuongminh N Pham
*Assistant Examiner* — Andrew Domenic Ondrejcak
(74) *Attorney, Agent, or Firm* — Ashurst Perkins Coie US LLP

(57) ABSTRACT

The invention concerns a fire extinguishing system for a roof with a solar installation, wherein the fire extinguishing system comprises an extinguishing apparatus with a plurality of groups of extinguishing agent outlets (8, 108) for discharging an extinguishing agent on the roof. Each group of extinguishing agent outlets (8, 108) is respectively assigned to a spatial extinguishing area (22, 23), wherein the extinguishing apparatus is configured such that extinguishing agent is dischargeable by means of extinguishing agent outlets (8) of a group independently of a discharging of the extinguishing agent by means of extinguishing agent outlets (108) of another group, and wherein at least two extinguishing areas (22, 23) overlap. The system furthermore comprises a detection apparatus (11) configured to detect, as a
(Continued)

detection location, a location where a fire has occurred or is likely to occur.

13 Claims, 7 Drawing Sheets

(51) Int. Cl.

| | |
|---|---|
| ***A62C 35/68*** | (2006.01) |
| ***A62C 37/36*** | (2006.01) |
| ***F24S 20/67*** | (2018.01) |
| ***H02S 20/23*** | (2014.01) |

(56) References Cited

U.S. PATENT DOCUMENTS 7,909,111 B1 * 3/2011 Hinojosa .............. A62C 3/0214 239/69
8,286,719 B2 * 10/2012 Vetesnik ................ A62C 31/12 169/70
11,247,087 B2 * 2/2022 McDonald ........... G08B 17/005
11,654,316 B1 * 5/2023 Pipe ........................ A62C 35/68 169/54
12,478,815 B2 11/2025 Baumann et al.

FOREIGN PATENT DOCUMENTS

WO WO0200303 1/2002
WO WO2005042105 5/2005

OTHER PUBLICATIONS

International Searching Authority, International Search Report with English translation, International Application No. PCT/EP2021/053674, 9 pages; May 3, 2021.
International Searching Authority, Written Opinion of the Searching Authority with English translation, International Application No. PCT/EP2021/053674, 18 pages; May 3, 2021.

* cited by examiner

FIRE EXTINGUISHING SYSTEM FOR A ROOF WITH A SOLAR INSTALLATION

PRIORITY CLAIM AND INCORPORATION BY REFERENCE

This application is a 35 U.S.C. § 371 application of International Application No. PCT/EP2021/053674, filed Feb. 15, 2021, which claims the benefit of German Application No. 102020103814.3, filed Feb. 13, 2020, each of which is incorporated by reference in its entirety.

BACKGROUND AND SUMMARY OF THE INVENTION

The invention relates to a fire extinguishing system for a roof with a solar installation. Furthermore, the invention relates to a solar installation system with the fire extinguishing system and at least one solar panel.

Extinguishing a fire on a roof with a solar installation is often problematic because winds occurring on the roof can make it difficult to extinguish the fire and potentially a relatively large amount of extinguishing agent may enter the building from above.

It is therefore an object of the present invention to provide a fire extinguishing system that allows for an improved extinguishment of a fire on a roof with a solar installation.

The object is achieved by means of a fire extinguishing system for a roof with a solar installation, the fire extinguishing system comprising:

- an extinguishing apparatus with a plurality of groups of extinguishing agent outlets for discharging an extinguishing agent on the roof, each group of extinguishing agent outlets being respectively assigned to a spatial extinguishing area, wherein the extinguishing apparatus is configured such that extinguishing agent is dischargeable by means of extinguishing agent outlets of a group independently of a discharging of the extinguishing agent by means of extinguishing agent outlets of another group and wherein at least two extinguishing areas overlap, and
- a detection apparatus configured to detect, as a detection location, a location where a fire has occurred or is likely to occur.

The winds expected on the roof can have the effect that the detection location, i.e. the location where the fire has been detected, does not exactly coincide with the real fire location. For instance, if the detection apparatus comprises a heat detector, the detection location can, due to the convection currents being changed by the winds, differ from the real fire location. Also if the detection apparatus comprises other detector types, wind can result in a detection location being shifted in comparison to the actual fire location. If, for instance, a smoke detector is used, drifting billows of smoke can result in such kinds of shifts of the detection location. When using a radiation based detector such as an IR and/or UV detector, the wind can effect a flame distortion and thus a shifted detection location.

The detection location being shifted in comparison to the actual fire location can generally have the effect that an extinguishing area is activated for extinguishment that may cover the detection location, but not the real fire location. This problem occurs particularly in boundary regions of the groups in which different extinguishing areas adjoin each other. To counteract this problem, the extinguishing areas overlap.

Since the groups of extinguishing agent outlets can be addressed separately, it is possible to extinguish independently in the individual extinguishing areas. It is therefore not necessary to always discharge an extinguishing agent on the entire roof, which allows to reduce an entrance of extinguishing agent into a building. The extinguishing agent can, for instance, be discharged in only one or in a plurality of specified extinguishing areas.

The extinguishing areas can also be understood as group action areas. The extinguishing areas or group action areas, respectively, can be formed, for instance, by i) a first set of extinguishing agent outlets with extinguishing nozzles for discharging the extinguishing agent being arranged in a first extinguishing area and connected to each other via a first pipe system, ii) a second set of extinguishing agent outlets with extinguishing nozzles for discharging the extinguishing agent being arranged in a second extinguishing area and connected to each other via a second pipe system, iii) a third set of extinguishing agent outlets with extinguishing nozzles for discharging the extinguishing agent being arranged in a third extinguishing area and connected to each other via a third pipe system, et cetera. The extinguishing apparatus is preferentially configured such that the extinguishing agent is discharged simultaneously at least by extinguishing agent outlets of a same group. The extinguishing areas, i.e. the group action areas, each preferentially extend over at least 50 $m^2$.

The roof is preferentially a flat roof. The roof has preferentially a roof inclination of less than 10°.

Furthermore, it is preferred that, to each extinguishing area, a pipe system for guiding the extinguishing agent to the respective extinguishing agent outlets is assigned, the pipe system of an extinguishing area being configured such that the extinguishing agent outlets are arranged along at least one line that extends in a guiding direction, wherein the pipe system of another extinguishing area is also configured such that extinguishing agent outlets are arranged along at least one line that extends in the guiding direction, wherein the extinguishing areas overlap in the guiding direction.

Solar panels are often arranged in rows on a roof, in which case it makes sense to install the fire extinguishing system together with the solar installation on the roof in such a way that the solar panel rows are also aligned in the guiding direction. Particularly if solar panels are arranged in such a manner along a specific direction, which is herein referred to as guiding direction, it is to be assumed that also winds on the roof are generally at least in part led along this guiding direction. The undesirable effect of the shift of the detection location from the actual fire location, caused by the wind, then occurs most likely and most strongly in this guiding direction. To counteract this effect, the overlap between the extinguishing areas therefore preferentially takes place at least in this guiding direction. In a preferred embodiment, the overlap region has a length of at least 2 m, more preferably of at least 3 m, in the guiding direction.

Overlapping extinguishing areas are preferentially arranged adjacent to each other in the guiding direction, wherein the extinguishing agent outlets of different groups assigned to the overlapping extinguishing areas are preferentially arranged along lines that are offset from each other perpendicular to the guiding direction. A first set of lines of a first group of extinguishing agent outlets that are assigned to a first extinguishing area and a second set of lines of a second group of extinguishing agent outlets that are assigned to a second extinguishing area overlapping with the first extinguishing area preferentially interlock. In other words, among the extinguishing agent outlets of the first group, at least those extinguishing agent outlets which are arranged furthest in the direction of the second group are arranged a) at the same position, relative to the guiding direction, as those extinguishing agent outlets of the second group of extinguishing agent outlets that are arranged furthest in the direction of the first group or b) arranged at a position that is, relative to the guiding direction, shifted yet further in the direction of the second group.

Furthermore, it is preferred that the fire extinguishing system comprises a controller configured to control the extinguishing apparatus in dependence on the detection location. In particular, the controller is configured to determine in which extinguishing area the detection location is located and to control the extinguishing apparatus such that the extinguishing agent is discharged in the determined extinguishing area. If the detection location is located in an overlap region, in which extinguishing areas overlap each other, then these overlapping extinguishing areas are determined and the extinguishing agent is discharged in these extinguishing areas. Also one or more detection locations in a non-overlapping part of an extinguishing area can be detected. In this case, this extinguishing area is determined and the extinguishing agent is discharged only in this extinguishing area. The controller is preferentially configured to control the extinguishing apparatus such that, if a plurality of extinguishing areas have been determined, the extinguishing agent is discharged in all determined extinguishing areas simultaneously.

The detection apparatus can be configured to detect a fire by means of radiant heat and/or by means of convective heat transfer. The detection apparatus preferentially comprises a plurality of detectors that are arranged at different detection locations and respectively assigned to an extinguishing area, and, in the overlap region, a plurality of extinguishing areas. These assignments are known to the controller. The assignments can, for instance, be stored in the controller or in a separate memory to which the controller is connected. Based on the assignments, the controller can immediately recognize in which extinguishing area a detection location has been detected and immediately activate the extinguishing areas intended for extinguishing.

In an embodiment, it is also known to the controller which detector is located at which detector location. Also the locations of the extinguishing areas can be known to the controller in an embodiment. The information can, for instance, be input to the controller or a memory connected to the controller upon installation of the fire extinguishing system. The controller can then be configured to use this location information to determine the extinguishing areas to be activated.

It is preferred that the extinguishing agent outlets comprise extinguishing nozzles that alternately point in opposing directions and comprise a horizontal discharge angle smaller than 360°. Furthermore, it is preferred that the horizontal discharge angle is smaller or equal to 270°, and it is particularly preferred that the horizontal discharge angle is smaller or equal to 180°. In principle, also extinguishing nozzles can be used that respectively comprise a horizontal discharge angle of 360°, in which case there would be no alternating discharge directions between neighboring extinguishing nozzles. These extinguishing nozzles with a 360° discharge characteristic, however, generally have, for identical pressure, a smaller range than two alternately arranged extinguishing nozzles with a horizontal discharge angle that is smaller than, for instance, 180°, as a result of which the required amount of pipes per extinguishing area may ultimately increase. The alternating use of extinguishing nozzles with a horizontal discharge angle smaller than 360° therefore allows for a large-scale discharge of extinguishing agent with relatively few pipes.

The extinguishing agent outlets preferentially comprise extinguishing nozzles with a flat spray cone in order to achieve a uniform coverage of the roof with the extinguishing agent as fast as possible. A spray cone is particularly regarded as flat if the vertical discharge angle is smaller than the horizontal discharge angle. In a preferred embodiment, the horizontal discharge angle is equal to twice the vertical discharge angle. Again, it is particularly preferred that the horizontal discharge angle is smaller or equal to 180°.

The discharge angle here is the opening angle of the spray pattern, wherein vertical and horizontal are to be understood relative to the roof surface. For opening angles that are smaller than 180°, the spray pattern is a cone.

Furthermore, it is preferred that the detection apparatus comprises a plurality of detectors for detecting the location where a fire has occurred or is likely to occur, the detectors being arranged along straight lines. The detectors along the straight lines preferentially form heat detectors, i.e. line-shaped heat detectors, which are preferentially resettable. The detectors are hence preferentially heat detectors, wherein a fire or a likely occurrence of a fire at a detector location and thus the detection location can be determined on the basis of a heat measurement. For instance, a detection location can be detected if the measured heat and/or a measured heat gradient at this location has exceeded a predetermined threshold value. Preferentially, the detector measures the heat on the basis of a temperature measurement, such that a detection location can be detected if the measured temperature and/or a temperature gradient at this location exceeds a threshold value. Also other detectors can be used. For instance, the detectors can be smoke detectors, preferentially line-shaped smoke detectors or aspirating smoke detectors.

In a preferred embodiment, the detectors are arranged along straight lines that extend in the guiding direction. As has been explained above, the undesirable effect of a deviation of the detection location from the actual fire location caused by the wind occurs most likely and most strongly in this guiding direction. A fire detection as accurate as possible in this guiding direction can hence further improve the fire extinguishing system.

The extinguishing apparatus can be configured to use water or extinguishing foam as extinguishing agent. When using extinguishing foam as extinguishing agent, less or no extinguishing agent enters into the roof, as a result of which extinguishing damages can be reduced. The use of water as extinguishing agent allows for a technically simpler construction of the extinguishing apparatus. When using water as extinguishing agent, the extinguishing apparatus preferentially comprises a pipe system and a water valve, the pipe system being configured to guide water from the water valve to the extinguishing agent outlets.

If extinguishing foam is used as extinguishing agent, the extinguishing apparatus preferentially comprises a pipe system, a water valve and a foam generator for generating extinguishing foam, the pipe system being configured to guide water from the water valve to the foam generator and extinguishing foam from the foam generator to the extinguishing agent outlets. For generating the extinguishing foam, the foam generator sucks in air and can generate the extinguishing foam with a relatively small expansion ratio, such that extinguishing foam is transported from the foam generator to the extinguishing agent outlets with this relatively small expansion ratio. As foam generator, a foam generator known under the product name "Viking Foam Generator" can be used, for instance. The foaming agent can, for instance, be a synthetic surfactant foaming agent or a protein foaming agent. However, also other foam generators and/or other foaming agents can be used. The water valve is preferentially a deluge valve. For instance, "Minimax FSX", "Viking Model E-1", "Viking Model E-3", Viking Model H-1, "Viking Model H-3" or other deluge valves can be used as deluge valves. The deluge valves "Minimax FSX", "Viking Model H-1" and "Viking Model H-3" are electrically resettable. The deluge valves "Viking Model E-1" and "Viking Model E-3" are models with electrical stimulus. The deluge valve comprises a trigger mechanism that may, for instance, be pneumatic, electric or hydraulic. In a preferred embodiment, a magnetic valve is used for electrically triggering the deluge valve. This allows for a particularly reliable triggering.

The extinguishing agent outlets can be configured such that they also contribute to the generating of foam. The extinguishing foam can hence be generated in two stages, wherein, in a first stage, extinguishing foam is generated in the pipe system by means of the foam generator and, in a second stage, the extinguishing foam is further generated by means of, for instance, extinguishing nozzles. The extinguishing nozzles contribute to the generating of foam without external energy. It is preferred in this regard that, in the first stage, a minimum foaming is generated, which is dimensioned such that already due to the minimum foaming requirement alone the extinguishing foam can hardly enter a building through the roof, particularly through a roof cladding. The foaming requirement can then be relatively low for the extinguishing nozzles. In general, the fire extinguishing system is preferentially configured such that the degree of foaming is not so high that the wind carries away the then relatively light foam.

In a preferred embodiment, the extinguishing foam finally being discharged as extinguishing agent is low-expansion foam with an expansion ratio between and including 4 and 20 or a medium-expansion foam with an expansion ratio between 21 and 200. In a particularly preferred embodiment, the discharged extinguishing agent is low-expansion foam with the expansion ratio 6. The expansion ratio is herein the ratio between the volume of the finally discharged finished extinguishing foam to the volume of the mixture of water and foaming agent used. The low-expansion foam used and the medium-expansion foam used have the advantage that, in comparison to high-expansion foam, they cannot be blown away as easily, which is particularly important when extinguishing a fire on a roof.

The extinguishing agent outlets preferentially comprise extinguishing nozzles. The extinguishing nozzles can, for instance, be the extinguishing nozzles with the product designation "Viking Model C-1 Window Sprinkler". The extinguishing nozzles can also be so-called "aspirating sprinklers", in which case an additional foam generator can preferentially be dispensed with. The extinguishing nozzles can also comprise a foam generating attachment.

In an embodiment, the distance between two neighboring extinguishing agent outlets of a same group is at most 160 cm. In another embodiment, this distance can, however, also be larger.

The above-mentioned object is also achieved by means of a fire extinguishing system for a roof with a solar installation that comprises:

- an extinguishing apparatus with a plurality of groups of extinguishing agent outlets for discharging an extinguishing agent on the roof, each group of extinguishing agent outlets being respectively assigned to a spatial extinguishing area, wherein the extinguishing apparatus is configured such that extinguishing agent is dischargeable by means of extinguishing agent outlets of a group independently of a discharging of the extinguishing agent by means of extinguishing agent outlets of another group,
- a detection apparatus configured to detect, as a detection location, a location where a fire has occurred or is likely to occur, and
- a controller configured to control the extinguishing apparatus in dependence on the detection location, wherein, if the detection location is located in a predefined boundary region including at least two adjacent subregions of different extinguishing areas, the extinguishing agent is discharged in the extinguishing areas whose subregions are included in the boundary region.

As explained above, a detection location that is shifted in comparison to the actual fire location could in principle cause an extinguishing area being activated that may cover the detection location, but not the real fire location. As also explained above, this problem particularly occurs in boundary regions of the groups in which different extinguishing areas adjoin each other. In order to counteract this problem, extinguishing areas can overlap, but it is also possible to define a boundary region including at least two adjacent subregions of different extinguishing areas and to discharge the extinguishing agent in the extinguishing areas whose subregions are included in the boundary region if the detection location is located in the defined boundary region. In other words, if the detection location is located in a first extinguishing area and if the real fire location is located in an adjacent, second extinguishing area, nevertheless both extinguishing areas are activated, such that the shift of the detection location relative to the actual fire location caused by the wind does not lead to the false, first extinguishing area being triggered alone and hence to no extinguishment. Expressed yet differently, if a detection location located in an extinguishing area is additionally located at a distance below a threshold distance to a neighboring extinguishing area, both extinguishing areas are triggered. With such a use of a boundary region, an overlap of the boundary regions can be dispensed with. The individual extinguishing areas can thus be arranged exclusively adjacent to each other.

Since the controller uses the predefined boundary region for the control of the extinguishing apparatus, this boundary region is recorded or, respectively, stored in the controller. The boundary region is hence preferentially not defined by means of physical, actually present distinguishing features, for instance, but it is a virtual boundary region that is digitally stored in the controller.

In a preferred embodiment, the controller is configured such that a user such as an installer, for instance, can modify the boundary region. For this purpose, the controller itself can comprise an input means such as, for instance, a keypad. Alternatively or additionally, the controller can be configured such that it allows for a modification of the boundary region via a data connection which is particularly wireless. For instance, a mobile input unit can be connected to the controller by means of a data link in order to allow for a change of the boundary region. The mobile input unit can, for instance, be a mobile computer with input means such as a smartphone, for instance.

The boundary region can form a rectangle, particularly if the extinguishing agent outlets comprise a horizontal 360° discharge characteristic. The sides of the boundary region that extend parallel to the boundary between the extinguishing areas for which the boundary region is defined can hence respectively be a straight line. The boundary region can, however, also comprise a different shape. For instance, the sides of the boundary region extending parallel to the boundary between the extinguishing areas for which the boundary region is defined can respectively form a rectangle curve. This can particularly be the case if the extinguishing agent outlets discharge within an angle that is horizontally smaller than 360° and particularly equal to 180°, and the extinguishing agent is discharged by neighboring extinguishing agent outlets, as projected into a horizontal plane, in opposing directions.

The expressions “horizontal discharge characteristic”, “as projected into a horizontal plane”, “in opposing directions” et cetera do not mean that the discharge of extinguishing agent takes place in an exactly horizontal direction, but they merely refer to directional and angular indications projected into an imagined horizontal plane or, in other words, to directional and angular indications referring to a viewing direction “from above”. The expression “horizontal” is in this context preferentially to be understood relative to the roof surface. A horizontal plane is hence a plane that extends parallel to the roof surface. The expression “from above” then refers to a viewing direction that is perpendicular to the roof surface.

In an embodiment, the ends of the pipes of different, adjoining extinguishing areas oppose each other in such a manner that the respective adjacent, terminating extinguishing nozzles of different extinguishing areas point, “as viewed from above” in opposing directions. This is preferred because otherwise a “blind spot” could arise directly on the rear side of the adjacent, terminating extinguishing nozzles, i.e. a region in which no extinguishing agent is discharged.

It is preferred that, to each extinguishing area, a pipe system for guiding the extinguishing agent to the respective extinguishing agent outlets is assigned, the pipe system of an extinguishing area being configured such that the extinguishing agent outlets are arranged along at least one line extending in a guiding direction, wherein the pipe system of another extinguishing area is also configured such that extinguishing agent outlets are arranged along at least one line extending in the guiding direction, wherein the boundary region is defined such that it covers a boundary line between adjacent extinguishing areas that extends perpendicular to the guiding direction.

Solar panels are, as explained above, often arranged in rows on a roof, wherein it then makes sense to install the fire extinguishing system together with the solar installation on the roof such that the solar panel rows are also aligned in the guiding direction. Particularly if solar panels are arranged in this way along a specified direction, which is referred to herein as guiding direction, it is to be assumed, as also explained above, that winds on the roof are also generally guided at least in part along this guiding direction. The undesirable effect of the deviation of the detection location from the actual fire location caused by the wind then occurs most likely and most strongly in this guiding direction. In order to counteract this effect, the boundary region is preferentially defined in such a manner that it covers a boundary between adjacent extinguishing areas that extends perpendicular to the guiding direction.

The width of the boundary region in the guiding direction is preferentially large enough for the detection apparatus to be able to detect different locations in the guiding direction and within the boundary region where fires can occur. This means, although the location can be detected well, the boundary region is relatively wide in order to counteract the above-described wind effects.

The above-mentioned object is also achieved by means of a fire extinguishing system for a roof with a solar installation that comprises:

- an extinguishing apparatus with a group of extinguishing agent outlets for discharging an extinguishing agent on a roof, the extinguishing agent outlets comprising extinguishing nozzles that, pointing alternately in opposing directions, discharge extinguishing agent into a respective coverage region and comprise a discharge angle smaller than 360°, wherein coverage regions of neighboring extinguishing nozzles of the group overlap, and
- a detection apparatus configured to detect, as a detection location, a location where a fire has occurred or is likely to occur.

Also the overlapping of coverage regions of neighboring extinguishing nozzles of the group leads to an improved extinguishment of a fire on a roof with a solar installation. Furthermore, the alternate use of extinguishing nozzles with a horizontal discharge angle that is smaller than 360° allows for a large-scale discharge of extinguishing agent with relatively few pipes, as already explained above. Preferentially, the horizontal discharge angle is smaller or equal to 270°. It is particularly preferred that the horizontal discharge angle is smaller or equal to 180°.

Also the detection apparatus for this fire extinguishing system can be configured to detect a fire by means of radiant heat and/or by means of convective heat transfer. Furthermore, also this fire extinguishing system can comprise a controller configured to control the extinguishing apparatus in dependence on the detection location. Also further features of the detection apparatus and the controller described above can be comprised by this fire extinguishing system.

This fire extinguishing system can comprise one or more groups of extinguishing agent outlets. In an embodiment, the extinguishing apparatus comprises a plurality of groups of extinguishing agent outlets for discharging an extinguishing agent on the roof, wherein the extinguishing apparatus is configured such that a) the extinguishing agent is dischargeable by means of extinguishing agent outlets of at least one group independently of a discharging of the extinguishing agent by means of extinguishing agent outlets of at least one other group and b) the extinguishing agent is dischargeable by means of extinguishing agent outlets of at least the other group in dependence on a discharging of the extinguishing agent by means of extinguishing agent outlets of the one group. In this embodiment, it is not necessary to supply each group of extinguishing agent outlets with extinguishing agent separately and completely independently from other groups of extinguishing agent outlets, which can lead to a simplified construction of the extinguishing apparatus. For instance, the extinguishing apparatus can comprise a pipe system with extinguishing agent outlets of the groups, wherein, for instance, a first section of the pipe system comprises a first group of extinguishing agent outlets and a second section of the pipe system comprises a second group of extinguishing agent outlets. The extinguishing apparatus can then furthermore be configured such that the extinguishing agent is supplied into the first section of the pipe system and, via this first section, is also supplied into the second section of the pipe system, wherein between the first section of the pipe system and the second section of the pipe system a controllable valve can be located. If the extinguishing agent is supplied into the first section of the pipe system and the controllable valve is closed, the extinguishing agent only exits from extinguishing agent outlets of the first group. If the extinguishing agent is supplied into the first section of the pipe system and the controllable valve is opened, the extinguishing agent is also discharged via the extinguishing agent outlets of the second section of the pipe system.

In a further embodiment, the extinguishing apparatus is configured such that a) the extinguishing agent is dischargeable by means of extinguishing agent outlets of at least one group independently of a discharging of the extinguishing agent by means of extinguishing agent outlets of at least one other group and b) the extinguishing agent is dischargeable by extinguishing agent outlets of the at least one other group independently of a discharging of the extinguishing agent by means of extinguishing agent outlets of the at least one group. This allows for a more targeted application of the extinguishing agent and can hence lead to a reduced amount of extinguishing agent being needed for the fire extinguishment, by which, in turn, possible damages by the extinguishing agent can be reduced.

The extinguishing apparatus can be configured such that each extinguishing agent outlet discharges the extinguishing agent into a respective coverage region, wherein an overlap region of coverage regions of two neighboring extinguishing agent outlets of a same group is smaller than an overlap region of coverage regions of neighboring extinguishing agent outlets of different groups. This allows for a further improved extinguishment of a fire on a roof with a solar installation.

The comparison of the overlap regions preferentially refers to a projection of the coverage regions into a horizontal plane. In other words, it preferentially refers to a dimension of the coverage regions and overlap regions as viewed "from above". The "horizontal" plane here is preferentially a plane that, as explained above, extends parallel to the roof surface. The overlap region of coverage regions of two neighboring extinguishing agent outlets of a same group refers, if this overlap region is not constant for different neighboring extinguishing agent outlets, preferentially to an arithmetic average mean value or the largest overlap region of two neighboring extinguishing agent outlets of a same group. Also the overlap region of coverage regions of neighboring extinguishing agent outlets of different groups is preferentially an arithmetic mean value of overlap regions of coverage regions of neighboring extinguishing agent outlets of different groups or the maximum overlap region of overage regions of neighboring extinguishing agent outlets of different groups if these overlap regions of coverage regions of neighboring extinguishing agent outlets of different groups are not all the same.

The expression "neighboring extinguishing agent outlets" preferentially relates to a neighborhood in the direction of a respective pipe conduit on which the respective extinguishing agent outlets are arranged. The pipe conduits are, in turn, preferentially oriented in the direction of the above-mentioned guiding direction, such that the expression "neighboring extinguishing agent outlets" preferentially refers to a neighborhood in the guiding direction.

In a preferred embodiment, the overlap region of coverage regions of neighboring extinguishing agent outlets of different groups is at least twice as large as the overlap region of coverage regions of two neighboring extinguishing agent outlets of a same group.

The invention relates, furthermore, to a solar installation system for a roof, the solar installation system comprising the fire extinguishing system and at least one solar panel. Preferentially, the solar installation system comprises a plurality of solar panels arranged next to each other in the guiding direction.

It is preferred that the detection apparatus comprises a plurality of detectors for detecting the detection location, the detectors being installed on the solar panel in such a manner that the detectors are, after installation on the roof, arranged below the solar panel. In particular, the solar panel is arranged inclined in such a manner on the roof that it comprises an upper side and an opposing lower side, wherein the detectors are arranged below the solar panel in a region of the upper side. As a result of this, the detectors are protected from overly strong insolation, by which the lifetime of the detectors can be increased and the likelihood of an erroneous fire detection caused by the insolation can be reduced.

The extinguishing apparatus is preferentially configured such that, after installation of the solar installation system on the roof, the extinguishing agent outlets are arranged below the solar panel such that the extinguishing agent is dischargeable into a region below the solar panel. The extinguishing agent outlets preferentially comprise extinguishing nozzles that discharge the extinguishing agent into the region below the solar panel. If the solar panel, as described above, is arranged inclined on the roof, the distance between the extinguishing agent outlets and the roof preferentially corresponds to two thirds of the distance between the upper side of the solar panel and the roof. In particular, the distance of the extinguishing agent outlets corresponds to two thirds of the distance between a lower edge of the upper side of the solar panel and the roof.

BRIEF DESCRIPTION OF THE DRAWINGS

Subsequently, embodiments of the invention are described by reference to the following figures, wherein.

DETAILED DESCRIPTION OF THE INVENTION

Figure 1:
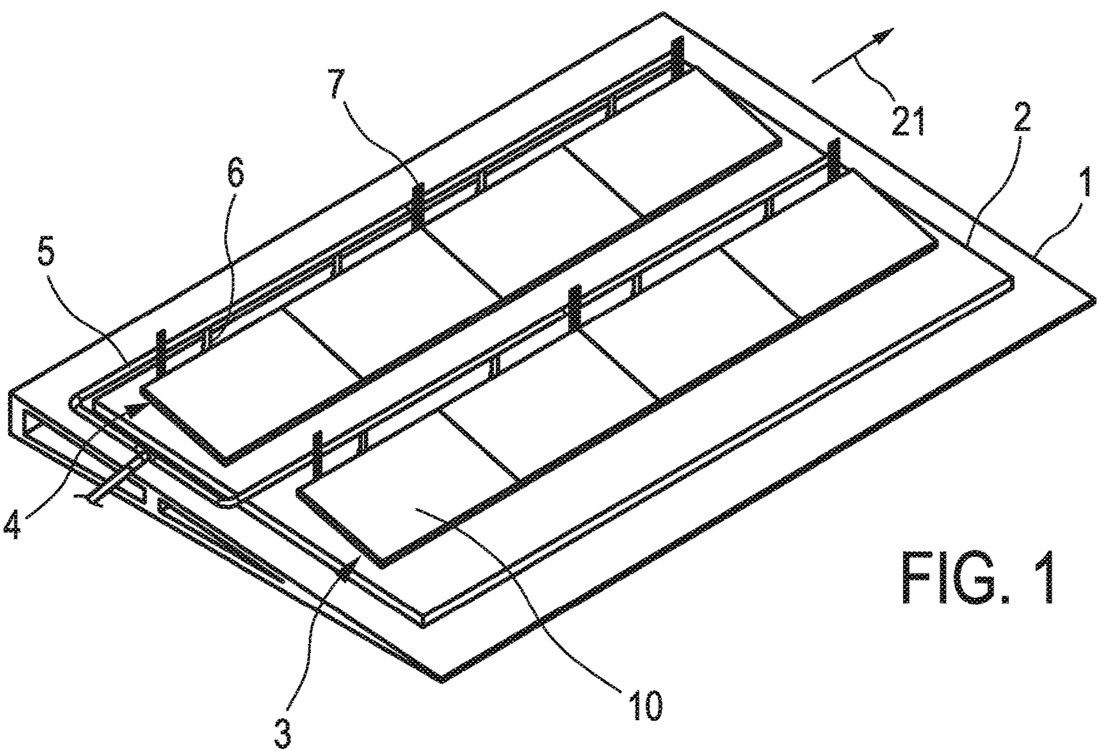
FIG. 1 illustrates schematically and exemplarily components of a solar installation system for a roof with a fire extinguishing system and a plurality of solar panels in a first view.

FIG. 1 illustrates schematically and exemplarily components of a solar installation system on a roof 1, wherein the solar installation system comprises a plurality of solar panels 10 and a fire extinguishing system. The solar panels 10 are in this embodiment arranged in two rows 3, 4 and mounted on a plate 2 that, in turn, is fixed on the roof 1. The fire extinguishing system comprises an extinguishing apparatus of which, in FIG. 1, horizontally extending pipes 5 for supplying extinguishing agent to the roof 1 and vertically extending pipes 6 are shown at whose ends extinguishing agent outlets with extinguishing agent nozzles are arranged. The extinguishing agent is hence guided via the horizontally extending pipes 5 and then via the vertically extending pipes 6 to the extinguishing agent outlets with the extinguishing nozzles, wherein the extinguishing agent outlets at the ends of the vertical pipes 6 are, in this illustration, arranged in two lines extending in a so-called guiding direction 21. The solar panels 10 and the horizontal pipes 5 are held by means of support struts 7.

The roof 1 is a flat roof, i.e. a roof having a roof inclination of less than 10°.

Figure 2:
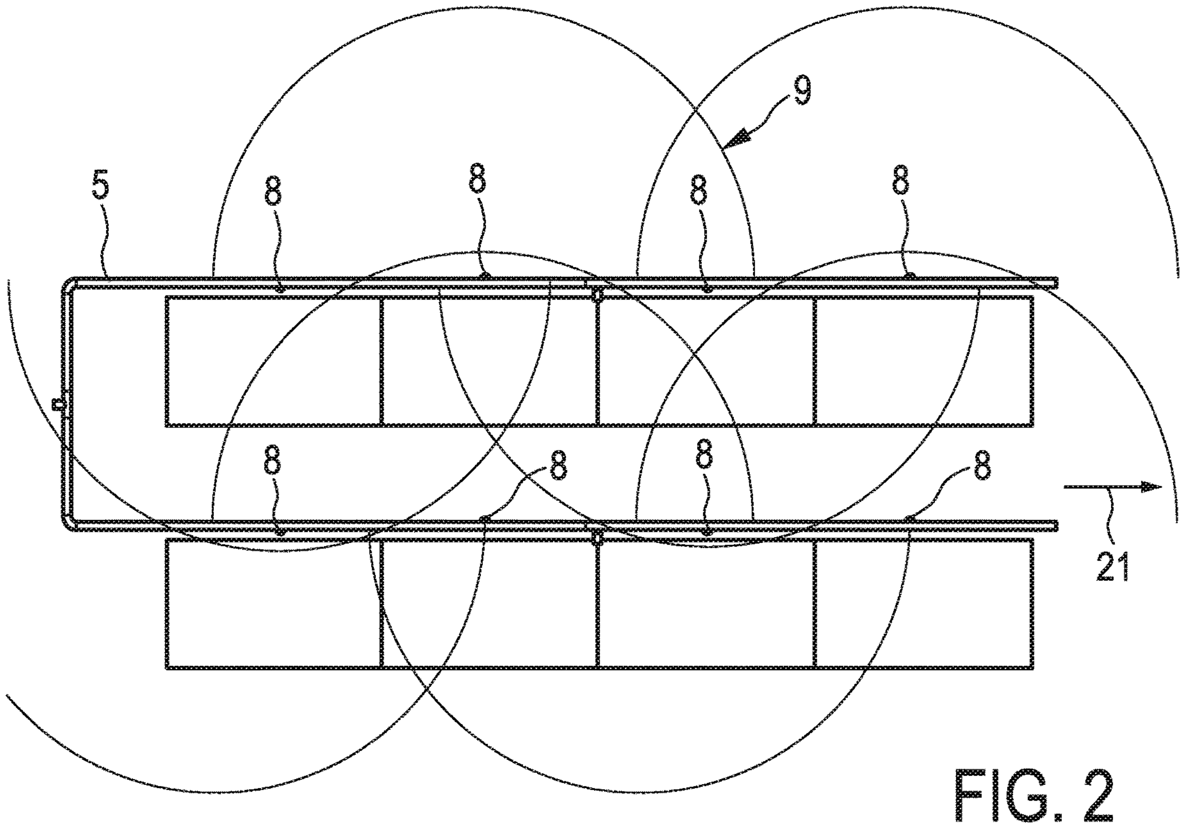
FIG. 2 shows a second schematic and exemplary view of the components illustrated in FIG. 1.

FIG. 2 shows schematically and exemplarily a top view onto the components shown in FIG. 1. In particular, FIG. 2 shows the extinguishing agent outlets 8 arranged in two lines together with their respective coverage regions 9. In this example, each extinguishing agent outlet 8 comprises an extinguishing nozzle having a horizontal discharge angle of 180°, wherein neighboring extinguishing agent outlets 8 along a pipe comprise extinguishing nozzles that discharge, "as viewed from above" in opposing directions. These directions, being projected into an imagined horizontal plane, are perpendicular to the course of the horizontal pipes 5 and hence perpendicular to the guiding direction 21.

Figure 3:
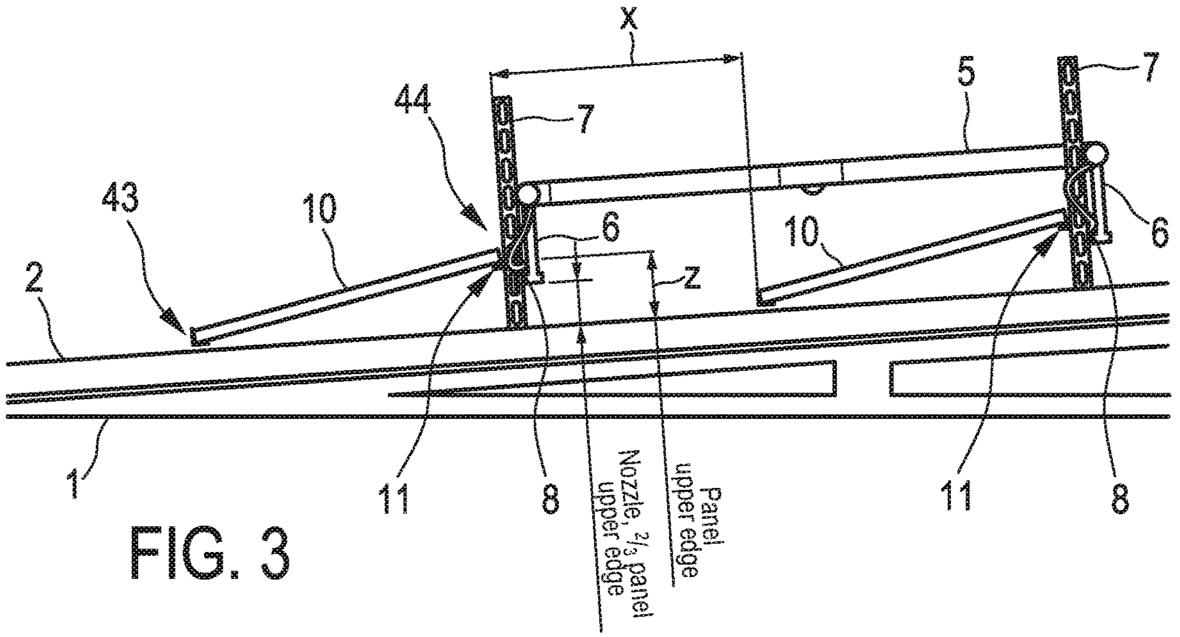
FIG. 3 shows a third schematic and exemplary view of the components illustrated in FIG. 1.

FIG. 3 shows schematically and exemplarily a lateral view of the components shown in FIGS. 1 and 2. As shown in FIG. 3, the solar panels 10 are preferentially arranged inclined on the plate 2 by means of the support struts 7, wherein the respective solar panel 10 comprises, due to the inclined position, an upper side 44 and an opposing lower side 43. The pipe system is installed such that the extinguishing agent outlets 8 with the extinguishing nozzles are arranged below the solar panels 10 in such a way that the extinguishing agent is dischargeable into a region below the respective solar panel 10. The extinguishing nozzles hence spray the extinguishing agent into the region below the respective solar panel 10. In this example, the distance between the extinguishing agent outlets 8 and the plate 2 is two thirds of the distance between the upper side 44 of the solar panel 10 and the plate 2. In particular, the distance of the extinguishing agent outlets 8 to the plate 2 is two thirds of the distance between a lower edge of the upper side 44 of the solar panel 10 and the plate 2. If, in another embodiment, the solar installation is installed directly on the roof 1, without using the plate 2, the distance between the extinguishing agent outlets 8 and the roof 1 is particularly two thirds of the distance between the upper side 44 of the solar panel 10, particularly the lower edge of the upper side 44 of the solar panel 10, and the roof 1.

In this embodiment, the distance x between opposing solar panels 10 of neighboring rows is at most 80 cm and the distance z between the lower edge of the upper side 44 of the respective solar panel 10 and the plate 2 is at most 80 cm. These dimensions are to be regarded as being merely exemplary. In other embodiments, these maximum values can also be exceeded.

The fire extinguishing system also comprises a detection apparatus 11 configured to detect, as a detection location, a location where a fire has occurred or is likely to occur. The detection apparatus 11 comprises a plurality of detectors 12 for detecting the detection location, wherein the detection apparatus 11 with the detectors 12 is installed on the respective solar panel 10 such that the detection apparatus 11 with the detectors 12, after installation on the roof 1, is arranged below the respective solar panel 10. In this embodiment, the detection apparatus 11 with the detectors 12 is arranged below the solar panel 10 in the region of the respective upper side 44. By this arrangement of the detection apparatus 11 with the detectors 12 below the solar panels 10, the detection apparatus is protected from overly strong insolation, as a result of which the lifetime of the detectors can be increased and the likelihood of an erroneous fire detection caused by the insolation can be reduced.

FIGS. 1 to 3 illustrate, as already mentioned above, only a few components of the entire solar installation system with the fire extinguishing system and the solar panels. In this embodiment, the entire solar installation system actually comprises six rows of solar panels 10, wherein the fire extinguishing system comprises two extinguishing areas with six horizontal pipes 5, 105 each, wherein one of these extinguishing areas is depicted exemplarily and schematically in FIG. 4. In FIGS. 1 to 3, only few components were illustrated for the purpose of a clearer presentation.

Figure 4:
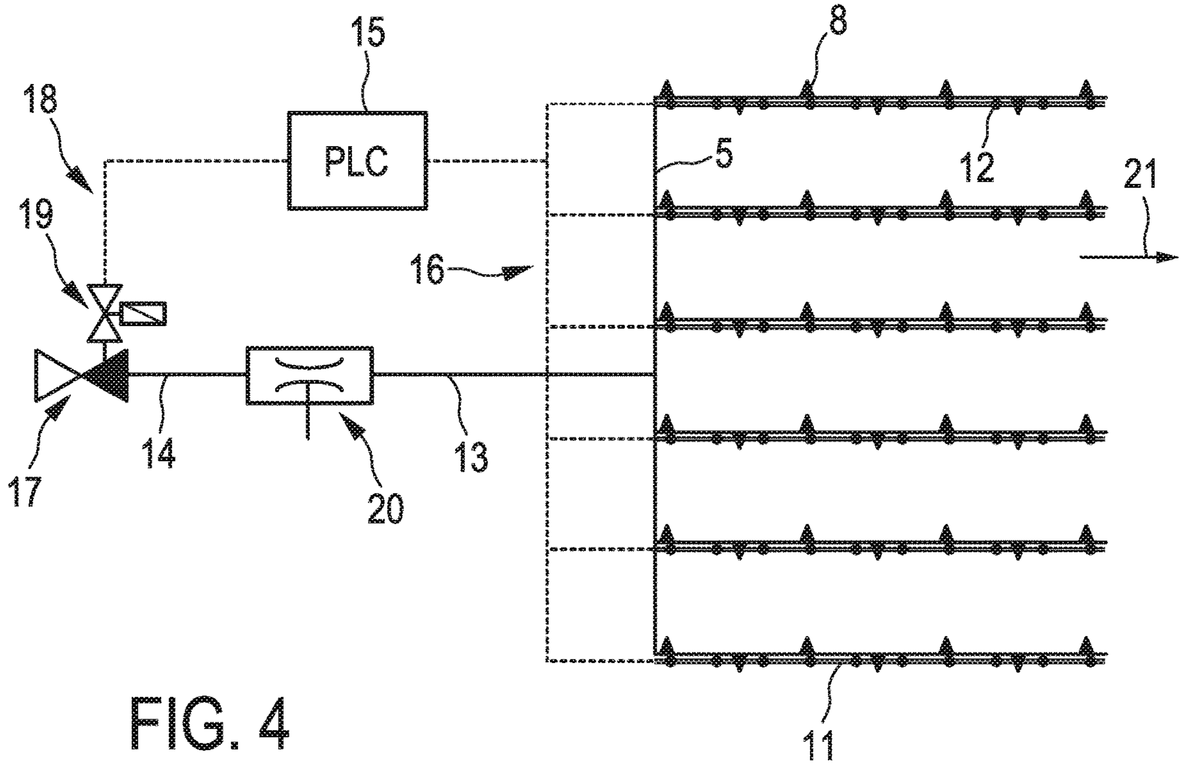
FIG. 4 illustrates schematically and exemplarily further components of a solar installation system with a fire extinguishing system.

The fire extinguishing system hence comprises an extinguishing apparatus with two groups of extinguishing agent outlets for discharging an extinguishing agent on the roof 1, wherein a first group of extinguishing agent outlets 8, together with further elements of the extinguishing apparatus and the fire extinguishing system, is shown in FIG. 4.

The fire extinguishing system comprises a controller 15 configured to control the extinguishing apparatus in dependence on the detection location. It is also depicted schematically in FIG. 4 that the detectors 12 of the detection apparatus 11 are respectively arranged along straight lines extending in the guiding direction 21. The detectors 12 of the detection apparatus 11 hence extend parallel to the horizontal pipes 5 and thus to the extinguishing agent outlets 8. In this embodiment, the detection apparatus 11 with the detectors 12 is a line-shaped resettable heat detector. The detectors 12 are hence preferentially heat detectors, wherein a fire or a likely occurrence of a fire at a detector location and thus a detection location can be determined on the basis of a heat measurement. For instance, a detection location can be detected if the measured heat and/or a measured heat gradient at this location has exceeded a predetermined threshold value. Preferentially, the respective detector 12 measures the heat on the basis of a temperature measurement, such that a detection location can be detected if the measured temperature and/or a temperature gradient at this location exceeds a predetermined threshold value. Also other detector types can be used, such as smoke detectors, for instance.

In this embodiment, the extinguishing apparatus is configured to use extinguishing foam as extinguishing agent. Extinguishing foam has, inter alia, the advantage that less or none of it enters the roof 1, by which extinguishing damages can be reduced. In another embodiment, however, also another extinguishing agent can be used, such as water, for instance. In this embodiment, low-expansion foam with the expansion ratio 6 is used as extinguishing agent. However, also other low-expansion and also medium-expansion foams can be used. For instance, a low-expansion foam with another expansion ratio between and including 4 and 20 or a medium-expansion foam with an expansion ratio between and including 21 and 200 can be used. Low-expansion and medium-expansion foams are preferred in comparison to high-expansion foams because they can be blown away by wind less easily.

The extinguishing apparatus of the fire extinguishing system comprises a deluge valve 17 with a magnetic valve 19 as trigger mechanism and a foam generator 20 that is connected to the deluge valve 17 via a pipe 14. The foam generator 20 is, in turn, connected to the pipe 5 via a pipe 13. The controller 15 is connected to the trigger mechanism 19 by means of a wiring 18 and to the line-shaped heat detector 11 by means of a further wiring 16, such that the controller 15 can control the trigger mechanism 19 in dependence on a detected fire.

As foam generator 20, for instance, a foam generator known under the product name "Viking foam generator" can be used. The foaming agent can, for instance, be a synthetic surfactant foaming agent or a protein foaming agent. However, also other foaming generators and/or other foaming agents can be used.

The extinguishing agent outlets 8 can be configured such that they also contribute to the generating of foam. The extinguishing foam can hence be generated in two stages, wherein, in a first stage, extinguishing foam is generated in the pipe system by means of the foam generator 20 and, in a second stage, the extinguishing foam is further generated by means of extinguishing nozzles. The extinguishing nozzles can contribute to the generating of foam without external energy. Preferentially, in the first stage, a minimum foaming is generated that is dimensioned such that, based on the minimum foaming alone, the extinguishing foam can hardly enter a building through the roof 1. The foaming requirement can then be relatively low for the extinguishing nozzles. However, it is also possible that the extinguishing foam is generated, for instance, in a single stage by the foam generator 20.

Figure 5:
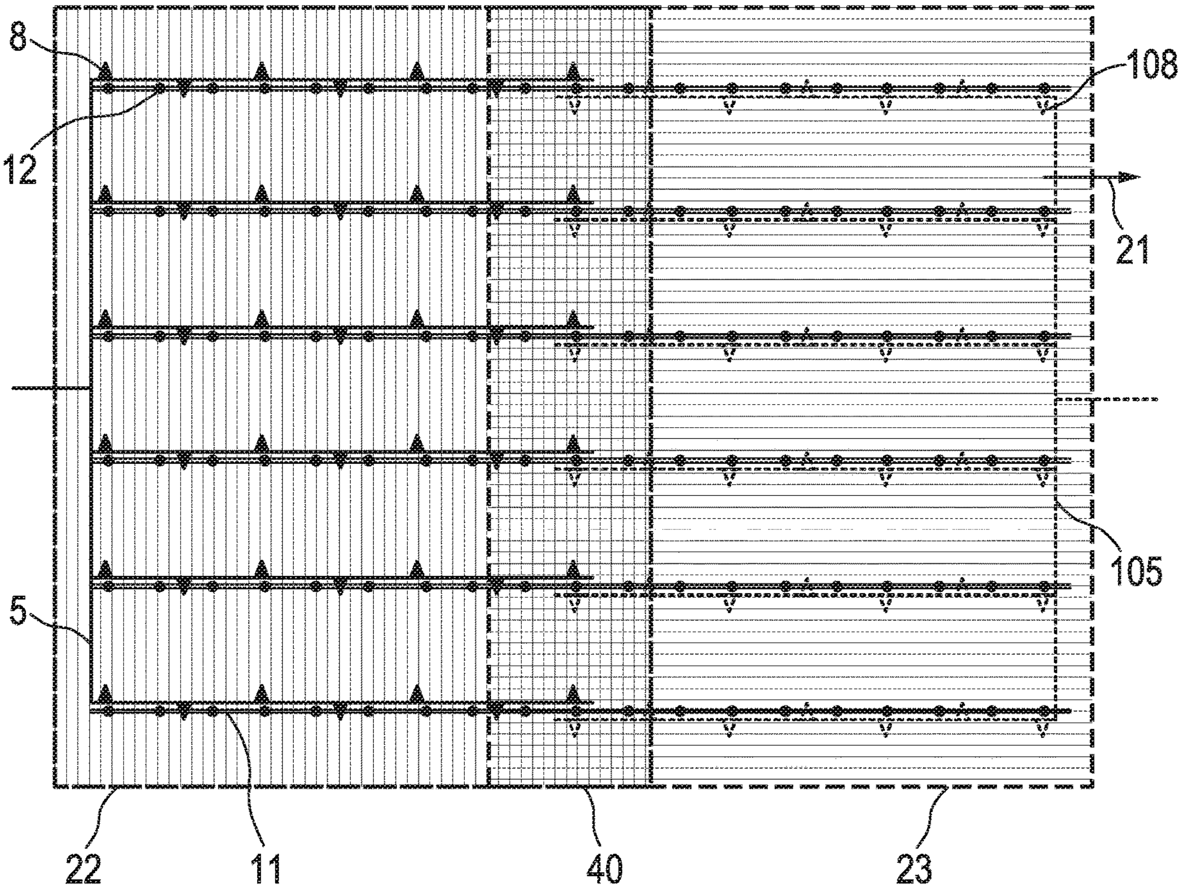
FIG. 5 depicts schematically and exemplarily overlapping extinguishing areas of a fire extinguishing system.

FIG. 4 shows, as described above, one of the two extinguishing areas of the extinguishing apparatus of the fire extinguishing system. The combination of both extinguishing areas is schematically and exemplarily depicted in FIG. 5.

As shown in this figure, the extinguishing apparatus comprises two groups of extinguishing agent outlets 8, 108 for discharging the extinguishing agent on the roof 1, wherein each group of extinguishing agent outlets 8, 108 is respectively assigned to a spatial extinguishing area 22, 23. The extinguishing apparatus is configured such that the extinguishing agent is dischargeable by means of extinguishing agent outlets 8 of the first group independently of a discharging of the extinguishing agent by means of the extinguishing agent outlets 108 of the second group, wherein the two extinguishing areas 22, 23 overlap in an overlap region 40.

The second extinguishing area is configured similar as the first extinguishing area which has been described above by reference to FIGS. 1 to 4. In particular, also the second extinguishing area comprises horizontal pipes 105 and vertical pipes that lead to the extinguishing agent outlets 108. Also the generating of foam and the control for the second extinguishing area can be realized as described above by reference to FIG. 4. In particular, both of the groups of extinguishing agent outlets 8, 108 are addressable separately from each other, such that extinguishing can take place in the extinguishing areas 22, 23 independently from each other. It is therefore not necessary to always discharge an extinguishing agent onto the entire roof 1, by which an entry of extinguishing agent into the building can be reduced.

The extinguishing areas 22, 23 can be understood as group action areas 22, 23, wherein i) the first group action area or the first extinguishing area 22, respectively, is formed by the extinguishing agent outlets 8 and ii) the second group action area or the second extinguishing area 23, respectively, is formed by the extinguishing agent outlets 108. The extinguishing apparatus is configured such that the extinguishing agent is discharged simultaneously by means of extinguishing agent outlets of a same group. In this embodiment, the extinguishing areas or group action areas 22, 23, respectively, each extend over at least 50 $m^2$.

As has been described above, a pipe system comprising the horizontal and vertical pipes 5, 6 is assigned to the first extinguishing area 22 for guiding the extinguishing agent to the extinguishing agent outlets 8, wherein, as also explained above, the pipe system of the first extinguishing area 22 is configured such that the extinguishing agent outlets 8 are arranged along straight lines extending in the guiding direction 21. The second extinguishing area 23 comprises a corresponding pipe system with horizontal and vertical pipes for guiding the extinguishing agent to the respective extinguishing agent outlets 108, wherein the pipe system of the second extinguishing area 23 is also configured such that its extinguishing agent outlets 108 are arranged along lines extending in the guiding direction 21, wherein the extinguishing areas 22, 23 overlap and form the overlap region 40 in this guiding direction 21. In this embodiment, the overlap region has, in the guiding direction 21, preferentially a length of at least 2 m and further preferred of at least 3 m.

The overlapping extinguishing areas 22, 23 are arranged next to each other in the guiding direction 21, wherein the extinguishing agent outlets 8, 108 of different groups that are assigned to the overlapping extinguishing areas 22, 23 are arranged along lines that are displaced with respect to each other perpendicularly to the guiding direction 21. A first set of lines of the first group of extinguishing agent outlets 8, which are assigned to the first extinguishing area 22, and a second set of lines of the second group of extinguishing agent outlets 108, which are assigned to the second extinguishing area 23 overlapping with the first extinguishing area 22, interlock. In this embodiment, among the extinguishing agent outlets 8 of the first group, those extinguishing agent outlets which are arranged furthest in the direction of the second group are arranged at the same position, with respect to the guiding direction 21, as those extinguishing agent outlets of the second group of extinguishing outlets 108 which are arranged furthest in the direction of the first group.

The controller 15 is preferentially configured to not only control the discharging of the extinguishing agent for the first extinguishing area 22, but also the discharging of the extinguishing agent for the second extinguishing area 23. In another embodiment, also a plurality of controllers can be present that carry out the corresponding controls of the extinguishing areas.

The controller 15 is configured to determine, on the basis of signals of the detection apparatus 11, in which of the extinguishing areas 22, 23 the detection location is located, and to control the extinguishing apparatus such that the extinguishing agent is discharged in the determined extinguishing area. If the detection location is located in the overlap region 40, in which the extinguishing areas 22, 23 overlap, then these overlapping extinguishing areas 22, 23 are determined and the extinguishing agent is discharged in both of these extinguishing areas 22, 23. It is also possible that one or more detection locations are determined in a non-overlapping part of an extinguishing area. In this case, the extinguishing agent is only discharged in this extinguishing area.

Due to the arrangement of the rows of solar panels in guiding direction 21, winds present on the roof are generally guided at least in part along this guiding direction 21. For this reason, a deviation of the detection location from the actual fire location particularly occurs in this guiding direction 21. To counteract this effect, the overlapping of the extinguishing areas 22, 23 takes place in the guiding direction 21.

The extinguishing apparatus is configured such that the extinguishing agent is discharged simultaneously through extinguishing agent outlets of a same group. Furthermore, the controller is preferentially configured to control the extinguishing apparatus such that the extinguishing agent is discharged simultaneously in both extinguishing areas 22, 23 if the detection location is located in the overlap region 40.

The detection apparatus 11 can be configured to detect a fire by means of radiant heat and/or by means of convective heat transfer. The detectors 12 of the detection apparatus 11 are arranged at different detection positions and respectively assigned to an extinguishing region 22, 23 and, in the overlap region 40, to both of the extinguishing areas 22, 23. In this embodiment, these assignments are known to the controller 15. The assignments can, for instance, be stored in the controller 15 or in a separate memory connected to the controller 15. Due to the assignments, the controller 15 can immediately recognize in which of the extinguishing areas 22, 23 a detection location has been detected and can immediately activate the extinguishing area or areas designated for extinguishing.

In this embodiment, the extinguishing nozzles of the extinguishing agent outlets 8, 108 comprise a horizontal discharge angle of 180°. However, also extinguishing nozzles comprising a smaller or a larger horizontal discharge angle can be used. The extinguishing nozzles are, for instance, the extinguishing nozzles with the product designation "Viking Model C-1 Window Sprinkler". The extinguishing nozzles can also be so-called "aspirating sprinklers". Furthermore, in this embodiment, which has been described by reference to FIGS. 1 to 5, the distance between two neighboring extinguishing agent outlets 8, 108 of a same extinguishing group 22, 23 is at most 160 cm. In another embodiment, this distance can however also be larger.

The winds expected on the roof can, as explained above, have the effect that the detection location, i.e. the location where the fire has been detected, does not exactly coincide with the real fire location. The detection location being shifted in comparison to the actual fire location, in turn, could in principle have the effect that an extinguishing area is activated for extinguishing that covers the detection location, but not the real fire location, wherein this problem particularly occurs in boundary regions between extinguishing areas. To counteract this problem, in the embodiment described by reference to FIG. 4, the extinguishing areas 22, 23 overlap in the overlap region 40. However, it is also possible to counteract this problem if the extinguishing areas do not overlap. This is described in the following by reference to FIG. 6.

Also in this embodiment the fire extinguishing system for a roof with a solar installation comprises an extinguishing apparatus with two groups of extinguishing agent outlets 8, 108 for discharging an extinguishing agent on the roof 1, each group of extinguishing agent outlets 8, 108 being respectively assigned to a spatial extinguishing area 24, 25. The extinguishing apparatus is configured such that extinguishing agent is dischargeable by means of extinguishing agent outlets 8 of a group independently of a discharging of the extinguishing agent by means of extinguishing agent outlets 108 of another group. In this embodiment, the extinguishing areas 24, 25, which could also be understood as group action areas, do not overlap. Furthermore, also in this embodiment a detection apparatus 11 with detectors 12 is present that is configured to detect, as a detection location, a location where a fire has occurred or is likely to occur. Moreover, also in this embodiment the fire extinguishing system comprises a controller 15 configured to control the extinguishing apparatus in dependence on the detection location. In this embodiment, however, the controller 15 is configured such that, if the detection location is located in a predefined boundary region 41 that includes two adjacent subregions of different extinguishing areas 24, 25, the extinguishing agent is discharged in both extinguishing areas 24, 25 whose subregions are included by the boundary region 41. In other words, if the detection location is located in the first extinguishing area 24 and inside the boundary region 41 and if the real fire location is located in the adjacent second extinguishing area 25, nevertheless both extinguishing areas 24, 25 are activated, such that the shift of the detection location relative to the actual fire location caused by the wind does not lead to a sole activation of the wrong, first extinguishing area and hence to no extinguishment.

Figure 6:
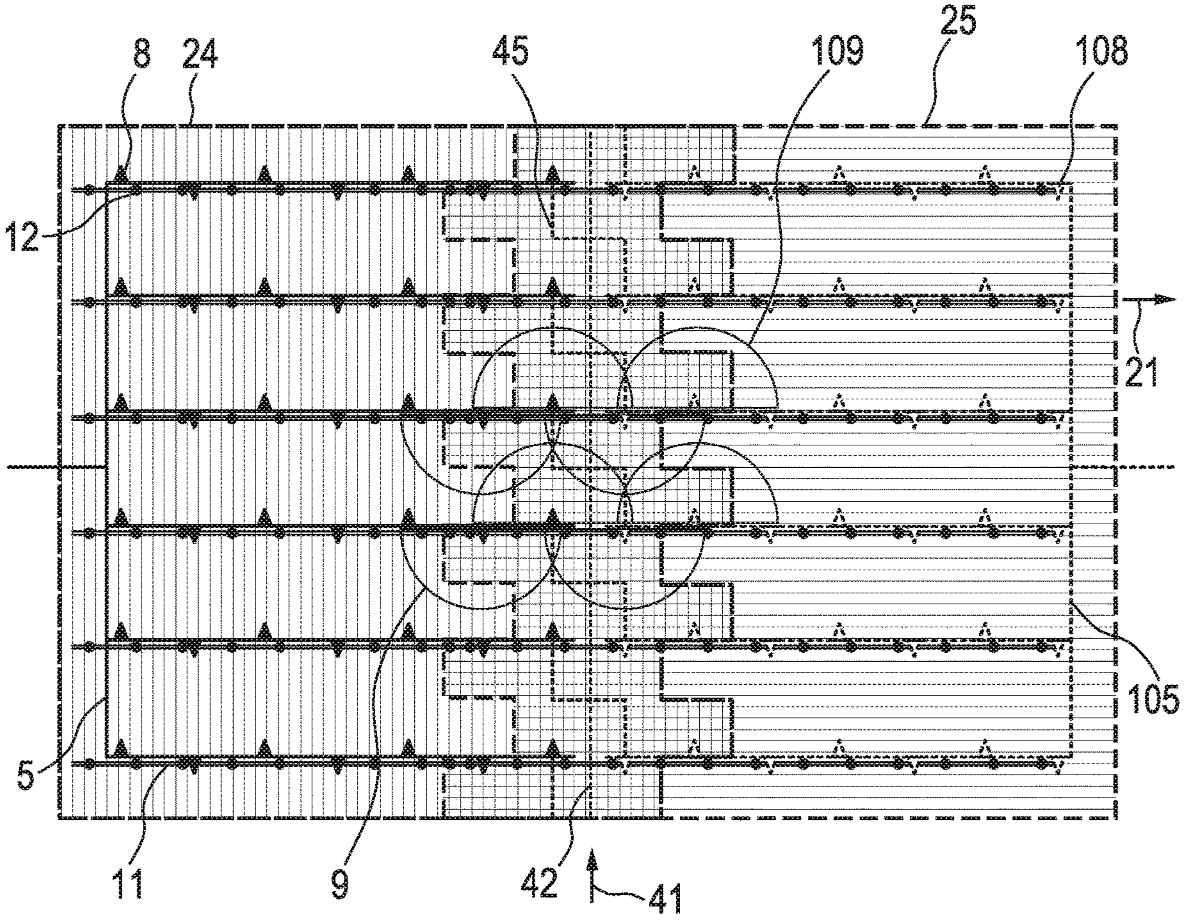
FIG. 6 depicts schematically and exemplarily a boundary region between adjacent extinguishing areas.

Apart from the non-existent overlap and the modified control, the fire extinguishing system described here by reference to FIG. 6 corresponds to the fire extinguishing system that has been described above by reference to FIG. 5. In particular, also in this embodiment a pipe system 5, 105 is assigned to each extinguishing area 24, 25 for guiding the extinguishing agent to the respective extinguishing agent outlets 8, 108, wherein the pipe system 5 of the first extinguishing area 24 is configured such that the extinguishing agent outlets 8 are arranged along lines extending in the guiding direction 21, and wherein the pipe system 105 of the other extinguishing area 25 is also configured such that the extinguishing agent outlets 108 are arranged along lines extending in the guiding direction 21. The boundary region 41 is defined in such a manner that it covers a boundary line 42 between the adjacent extinguishing areas 24, 25 that extends perpendicular to the guiding direction 21.

The ends of the pipes 5, 105 of different adjacent extinguishing areas 24, 25 oppose each other in such a manner that the respective adjoining, terminating extinguishing nozzles 8, 108 of different extinguishing areas 24, 25 point in different directions. Since the adjoining, terminating extinguishing nozzles 8, 108 of different adjacent extinguishing areas 24, 25 point in different directions, in the boundary region 41, a region directly above (top down view) a pipe section is supplied by an extinguishing nozzle 8 of the first extinguishing area 24, but directly below by the extinguishing nozzle 108 of the adjacent second extinguishing area 25, for instance. This is illustrated in FIG. 6 by the coverage regions 9, 109 of the extinguishing nozzles 8, 108 and the imagined extinguishing line 45. For this reason, the sides of the boundary region 41 arranged vertically in FIG. 6, i.e. the sides of the boundary region 41 that extend perpendicular to the pipes 5, 105 are formed as a rectangle curve.

Although in the described embodiments the extinguishing nozzles comprise a horizontal discharge angle of 180°, the discharge angle can also be larger or smaller.

Although in the above-described embodiments the extinguishing nozzles alternately point in opposing directions, it is also possible in other embodiments that extinguishing nozzles that are arranged neighboringly along a pipe point in the same direction. In particular, a plurality of extinguishing agent outlet positions can be present along a respective pipe in an embodiment, wherein at each extinguishing agent outlet position two extinguishing nozzles are arranged that point, in relation to a projection in a horizontal plane, in opposing directions at this same extinguishing agent outlet position.

Figure 8:
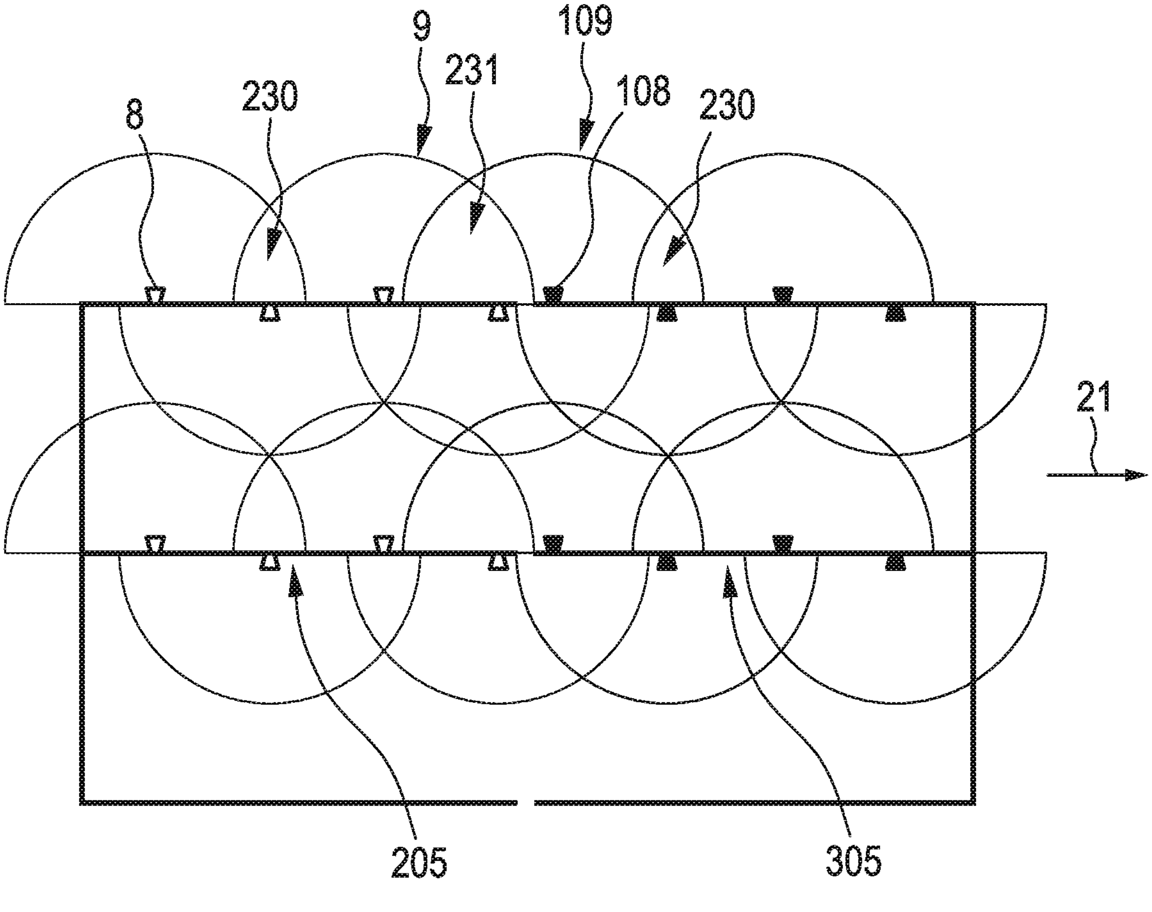
FIG. 8 illustrates schematically and exemplarily components of an embodiment of a fire extinguishing system for a roof with a solar installation and FIG. 9 illustrates schematically and exemplarily components of a further embodiment of a fire extinguishing system for a roof with a solar installation.

FIG. 8 shows schematically and exemplarily a further fire extinguishing system for a roof with a solar installation. The fire extinguishing system comprises an extinguishing apparatus with a group of extinguishing agent outlets 8 for discharging an extinguishing agent on the roof, the extinguishing agent outlets 8 comprising extinguishing nozzles that, pointing alternately in opposing directions, discharge extinguishing agent in a respective coverage region 9. The expression "pointing alternately in opposing directions" means that, in guiding direction 21, neighboring extinguishing nozzles 8 point in opposing directions, wherein the opposing directions relate to directions of the extinguishing nozzles 8 in a horizontal plane. The directions of neighboring extinguishing nozzles, as projected into an imagined horizontal plane, hence point in opposing directions. Expressed differently, the directions of neighboring extinguishing nozzles point, as viewed from above, in opposing directions.

The discharge angle of these extinguishing nozzles 8 is smaller than 360° and, in this embodiment, equal to 180°. Furthermore, the coverage region 9 of a respective extinguishing nozzle 8 is, in this embodiment, essentially semicircular, wherein also this relates to a projection of the coverage region into a horizontal plane. In other embodiments, the coverage region can also comprise a different shape.

The extinguishing agent outlets 8 are arranged on a pipe system 205 via which extinguishing agent is supplied to the extinguishing agent outlets 8, wherein the extinguishing agent outlets 8 are arranged on parallel pipes of the pipe system 205 that point in guiding direction 21. The supply of extinguishing agent can, for instance, be carried out as it has been described above by reference to FIG. 4.

In this embodiment, the extinguishing apparatus comprises a further group of extinguishing agent outlets 108 for discharging the extinguishing agent on the roof, wherein the extinguishing agent outlets 108 also comprise extinguishing nozzles that, pointing alternately in opposing directions, discharge extinguishing agent into a respective coverage region 109 and comprise a horizontal discharge angle smaller than 360° which also for the extinguishing nozzles 108 in this example is 180°. This second group of extinguishing agent outlets 108 is supplied with the extinguishing agent by means of a pipe system 305. Also the supply of the second pipe system 305 with the extinguishing agent can, for instance, be carried out as described above by reference to FIG. 4. In this embodiment, the pipe systems 205, 305 are entirely separated, such that the first group of extinguishing nozzles 8 and the second group of extinguishing nozzles 108 can be supplied with extinguishing agent entirely independently from each other.

In this embodiment, the extinguishing apparatus is configured such that an overlap region 230 of coverage regions 9 of two neighboring extinguishing agent outlets 8 of a same group is smaller than an overlap region 231 of coverage regions 9, 109 of neighboring extinguishing agent outlets of different groups. In particular, the coverage region of neighboring extinguishing agent outlets of different groups is, in this embodiment, more than twice as large as the overlap region 230 of coverage regions 9 of two neighboring extinguishing agent outlets 8 of a same group. The dimensions and sizes here relate preferentially to a projection of the overlap regions and coverage regions in an imagined horizontal plane. Thus, a manner of view "from above" is adopted here.

Figure 9:
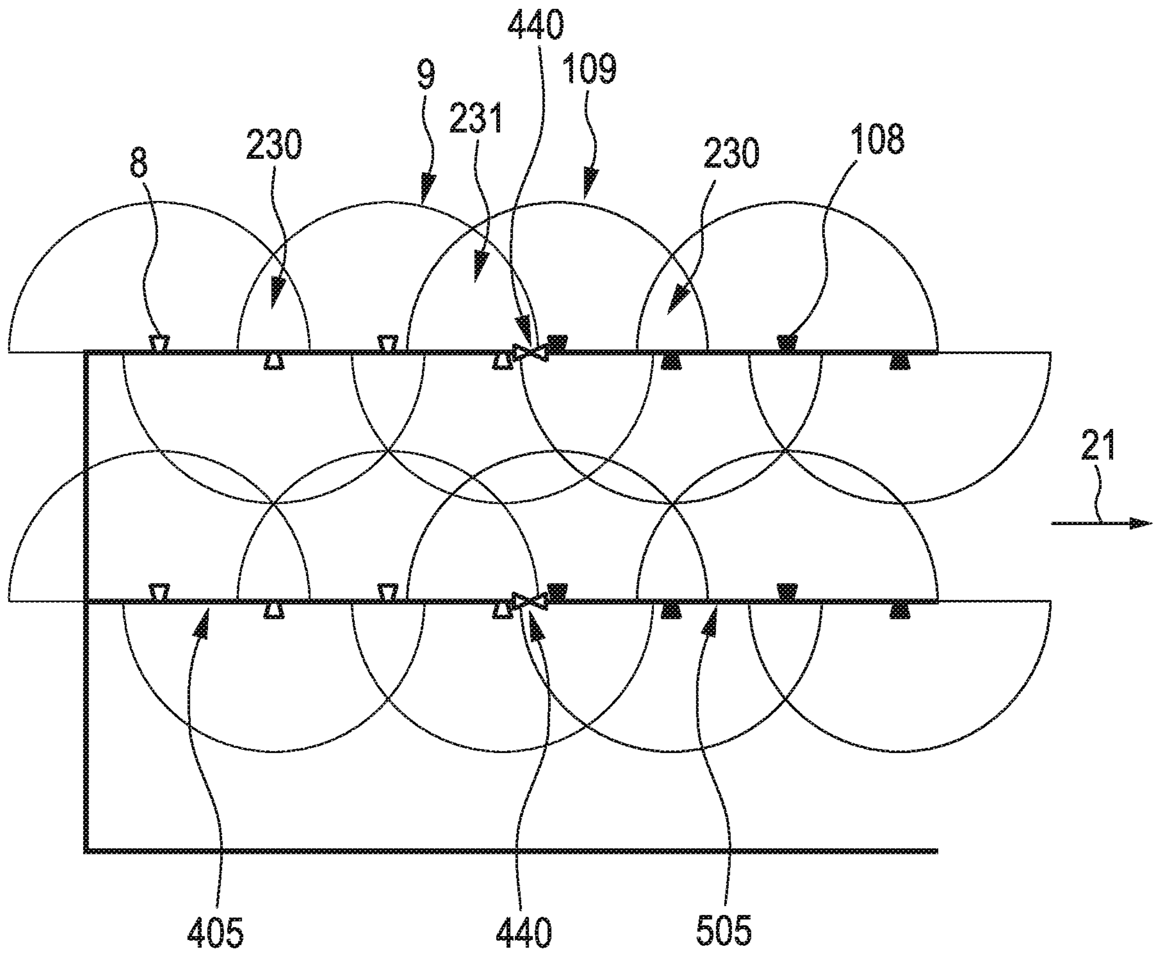

A further embodiment of a fire extinguishing system for a roof with a solar installation is exemplarily and schematically shown in FIG. 9. In this embodiment, the fire extinguishing system also comprises an extinguishing apparatus with a first group of extinguishing agent outlets 8 for discharging an extinguishing agent on the roof and a second group of extinguishing agent outlets 108 for discharging the extinguishing agent on the roof, wherein the first group of extinguishing agent outlets 8 and the second group of extinguishing agent outlets 108 are assigned to different extinguishing areas. The extinguishing agent outlets 8, 108 comprise extinguishing nozzles that, pointing alternately in opposing directions, discharge extinguishing agent in a respective coverage region 9, 109 and have a horizontal discharge angle smaller than 360°. In this embodiment, the horizontal discharge angle is 180°. The coverage regions 9, 109 of neighboring extinguishing nozzles 8, 108 of a same group overlap each other in a respective overlap region 230. Similarly as in the embodiment shown in FIG. 8, also in this embodiment an overlap region 230 of coverage regions 9 of two neighboring extinguishing agent outlets 8 of a same group is smaller than an overlap region 231 of coverage regions of neighboring extinguishing agent outlets 8, 108 of different groups.

The embodiment according to FIG. 9 however differs from the embodiment according to FIG. 8 in that the second group of extinguishing agent outlets 108 cannot discharge the extinguishing agent independently of a discharging of the extinguishing agent via the extinguishing agent outlets 8 of the first group. In particular, the extinguishing agent is in this embodiment a) dischargeable by means of the extinguishing agent outlets 8 of the first group independently of a discharging of the extinguishing agent by means of the extinguishing agent outlets 108 of the second group and b) dischargeable by means of the extinguishing agent outlets 108 of the second group in dependence of a discharging of the extinguishing agent by means of the extinguishing agent outlets 8 of the first group. To realize this, the extinguishing apparatus comprises a pipe system with a first section 405 and a second section 505, wherein the first section 405 and the second section 505 are connected to each other via valves 440.

The extinguishing apparatus is configured such that the extinguishing agent is supplied to the first section 405 of the pipe system and the second section 505 of the pipe system is also supplied with extinguishing agent if the valves 440 are opened. With opened valves 440, the supply of the extinguishing agent outlets 108 of the second group thus takes place via the first section 405 of the pipe system. The second section 505 of the pipe system does not have a direct connection to an extinguishing agent supply. Also in this embodiment the supply of extinguishing agent can, for instance, be realized as described above by reference to FIG. 4.

Although not depicted for reasons of clarity, also the fire extinguishing systems according to FIGS. 8 and 9 comprise detection apparatuses that are configured to detect, as a detection location, a location where a fire has occurred or is likely to occur. The detection apparatus preferentially corresponds to those which have been described above by reference to FIG. 4. The detection apparatus 11 can hence comprise a plurality of detectors 12 for detecting the location where a fire has occurred or is likely to occur, wherein the detectors 12 are arranged along straight lines oriented in guiding direction 21.

Figure 7:
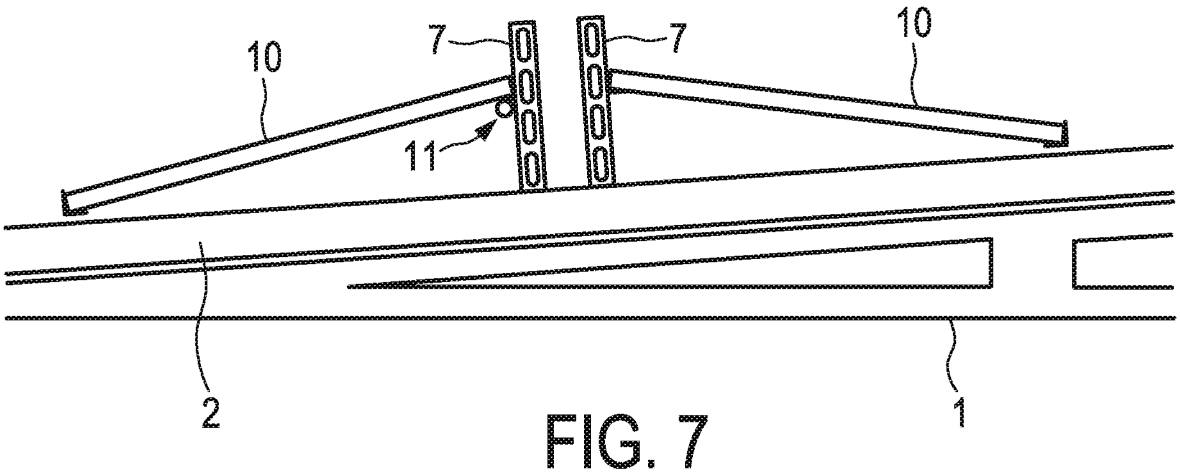
FIG. 7 shows schematically and exemplarily a specific arrangement of solar panels on a roof.

Although in the above embodiments the extinguishing apparatus and the solar panels are arranged in a specific manner, in other embodiments the extinguishing apparatus and/or the solar panels can also be arranged differently. For instance, opposing solar panels can be arranged inclined on the roof such that the respective higher side of the respective solar panel 10 faces the opposing solar panel, as schematically depicted in FIG. 7. Also in this embodiment, the solar installation system comprises a fire extinguishing system with extinguishing agent outlets that are preferentially configured such that the extinguishing agent is dischargeable into regions below the solar panels 10. The corresponding pipes and extinguishing agent outlets are not shown in FIG. 7 for reasons of clarity, since only an alternative arrangement of the solar panels is to be illustrated here.

Although in the embodiments described above by reference to FIGS. 1, 3 and 7 the solar panels are arranged on the roof by means of a plate, the solar panels can of course also be arranged on the roof in a different manner. For instance, the solar panels can be mounted on the roof by means of a rail system. It is also possible that the solar panels are directly mounted on the roof, i.e., in particular, without a plate being arranged between the solar panels and the roof.

The above described controllers are configured to carry out the corresponding control procedures. For this purpose, the control procedures can be implemented as program code of a computer program and/or as corresponding hardware. The controllers include, in particular, programmable logic controllers.

In the claims, the words “comprise” and “include” do not exclude other elements or steps and the indefinite article “a” does not exclude a plurality.

A single unit or apparatus can fulfill the functions of several items recited in the claims. The fact that individual functions and elements are recited in different dependent claims does not mean that a combination of these functions or elements could not also be used to advantageously.

A computer program can be stored and/or distributed on a suitable medium such as, for instance, an optical storage medium or a solid state medium supplied together with or as part of other hardware. The computer program may however also be distributed in other forms, such as, for instance, via the Internet or other telecommunication systems.

The reference signs in the claims are not to be understood in such a manner that the subject-matter and the scope of protection of the claims is limited by these reference signs.

LIST OF REFERENCE NUMERALS

1 roof
2 plate
3 first row of solar panels
4 second row of solar panels
5, 105, 205, . . . , 505 horizontally extending pipes for supplying the extinguishing agent
6 vertically extending pipes for supplying the extinguishing agent to the extinguishing nozzles
7 support struts for solar panels and pipes
8, 108 extinguishing nozzle, extinguishing agent outlet
9, 109 coverage region of an extinguishing nozzle
10 solar panel
11 line-shaped heat detector
12 detector
13 pipe of foam generator to pipe 5
14 pipe of deluge valve to foam generator
15 controller
16 wiring between heat detector and controller
17 deluge valve
18 wiring between deluge valve and controller
19 trigger mechanism, magnetic valve
20 foam generator
21 guiding direction
22 . . . 25 group action area, extinguishing area
40 overlap region of extinguishing areas
41 boundary region
42 boundary line
43 lower side of an installed solar panel
44 upper side of an installed solar panel
45 extinguishing line
230, 231 overlap region of coverage regions
440 valves

The invention claimed is:

1. A fire extinguishing system for a flat roof with less than 10 degrees inclination relative to ground, with a solar installation having solar panels arranged in spaced-apart rows on the roof, each of the rows of solar panels being oriented in a guiding direction, the fire extinguishing system comprising:

an extinguishing apparatus with a pipe in continuous fluid communication with a group of at least four extinguishing agent outlets, and a common valve that, upon actuation, provides an extinguishing agent to the pipe for distribution to each of the at least four extinguishing agent outlets for discharging the extinguishing agent on the roof, wherein each of the extinguishing agent outlets comprises extinguishing nozzles that discharge a flat spray pattern of the extinguishing agent into a coverage region and comprise a horizontal discharge angle smaller than or equal to 270°, wherein the coverage regions of neighboring extinguishing nozzles overlap, wherein the pipe positions each of the extinguishing nozzles along a first straight line extending in the guiding direction;

wherein the pipe positions each of the extinguishing nozzles along a respective second straight line being perpendicular to the guiding direction, each respective second line being offset from another respective second straight line;

wherein the extinguishing nozzles include a first set of extinguishing nozzles pointing in a first direction with respect to a row of the rows of solar panels and a second set of extinguishing nozzles pointing in a second opposite direction with respect to the row of the rows of solar panels;

wherein at least one of the nozzles of the first set of nozzles is aligned with the overlapping coverage regions of neighboring extinguishing nozzles of the second set of nozzles; and wherein at least one of the nozzles of the second set of nozzles is aligned with the overlapping coverage regions of neighboring extinguishing nozzles of the first set of nozzles; and a plurality of detectors configured to detect a detection location where a fire has occurred or is likely to occur.

2. The fire extinguishing system according to claim 1, wherein the detectors are arranged along straight lines.

3. The fire extinguishing system according to claim 2, wherein the detectors are arranged along straight lines that extend in the guiding direction.

4. The fire extinguishing system according to claim 1, wherein the extinguishing apparatus is configured to use extinguishing foam as the extinguishing agent, wherein the extinguishing apparatus further comprises a foam generator for generating extinguishing foam, the pipe being configured to guide water from the common valve to the foam generator and extinguishing foam from the foam generator to the extinguishing agent outlets.

5. The fire extinguishing system according to claim 4, wherein the extinguishing agent outlets are configured such that they also contribute to the generating of foam.

6. The fire extinguishing system according to claim 1, wherein the extinguishing apparatus comprises a plurality of groups of extinguishing agent outlets for discharging the extinguishing agent on the roof and wherein the group of at least four extinguishing agent outlets is a first group, the extinguishing apparatus being configured such that a) the extinguishing agent is dischargeable by the first group independently of a discharging of the extinguishing agent by a second group and b) the extinguishing agent is dischargeable by the second group in dependence on a discharging of the extinguishing agent by the first group.

7. The fire extinguishing system according to claim 1, wherein the extinguishing apparatus comprises a plurality of groups of extinguishing agent outlets for discharging the extinguishing agent on the roof and wherein the group of at least four extinguishing agent outlets is a first group, the extinguishing apparatus being configured such that a) the extinguishing agent is dischargeable by the first group independently of a discharging of the extinguishing agent by a second group and b) the extinguishing agent is dischargeable by the second group independently of a discharging of the extinguishing agent by the first group.

8. The fire extinguishing system according to claim 1, wherein the extinguishing apparatus comprises a plurality of groups of extinguishing agent outlets for discharging an extinguishing agent on the roof and wherein the group of at least four extinguishing agent outlets is a first group, and is configured such that each extinguishing agent outlet of the plurality of groups discharges the extinguishing agent into a coverage region, wherein an overlap region of coverage regions of two neighboring extinguishing agent outlets of the first group is smaller than an overlap region of coverage regions of neighboring extinguishing agent outlets of a second group.

9. A solar installation system for a roof, the solar installation system comprising:

a fire extinguishing system according to claim 1, and at least one solar panel.

10. The solar installation system according to claim 9, wherein the plurality of detectors are installed on the solar panel in such a manner that the detectors are, after installation of the solar installation system on a roof, arranged below the solar panel.

11. The solar installation system according to claim 10, wherein the solar panel is arranged inclined in such a manner on the roof that it comprises an upper side and an opposing lower side, wherein the detectors are arranged below the solar panel in a region of the upper side.

12. The solar installation system according to claim 9, wherein the extinguishing apparatus is configured such that, after installation of the solar installation system on a roof, the extinguishing agent outlets are arranged below the solar panel in such a manner that the extinguishing agent is dischargeable into a region below the solar panel.

13. The solar installation system according to claim 9, wherein the solar installation system comprises a plurality of solar panels arranged next to each other in the guiding direction.

* * * * *